(12) United States Patent
Gross et al.

(10) Patent No.: US 11,648,866 B2
(45) Date of Patent: May 16, 2023

(54) TRANSPORT VEHICLE AND TRANSPORT SYSTEM

(71) Applicant: Ford Global Technologies, LLC, Dearborn, MI (US)

(72) Inventors: Dwi Retnani Poetranto Gross, Aachen (DE); Matthias Stefan Groß, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/401,080

(22) Filed: Aug. 12, 2021

(65) Prior Publication Data

US 2022/0055519 A1 Feb. 24, 2022

(30) Foreign Application Priority Data

Aug. 18, 2020 (DE) .......................... 102020121594.0

(51) Int. Cl.
*B60P 1/02* (2006.01)
*B66F 9/075* (2006.01)
(Continued)

(52) U.S. Cl.
CPC ............ *B60P 1/025* (2013.01); *B62B 3/0643* (2013.01); *B66F 9/07504* (2013.01);
(Continued)

(58) Field of Classification Search
CPC ......... B60P 1/025; B60P 1/6445; B60P 3/007; B62B 3/0643; B62B 3/10; B62B 2202/12;
(Continued)

(56) References Cited

U.S. PATENT DOCUMENTS 2,804,174 A * 8/1957 Chasar ................ B66F 9/07522
280/659
3,458,212 A * 7/1969 Swezy .................... B60P 1/025
280/43.11
(Continued)

FOREIGN PATENT DOCUMENTS

CA 1267111 A * 3/1990 .............. B60P 1/025
CN 203444594 U * 2/2014
(Continued)

OTHER PUBLICATIONS

Yellow Jack-It, [p. 1], Yellow Jack-It™ Adjustable Fork Width Pallet Jack Truck 2200 Lb. Cap. KLS AP10-SL.

*Primary Examiner* — James Keenan
(74) *Attorney, Agent, or Firm* — Brandon Hicks; Eversheds Sutherland (US) LLP

(57) ABSTRACT

The invention relates to a transport vehicle for transporting at least one transport unit. The transport vehicle including at least one drive unit having at least one electric drive, at least one steerable vehicle wheel, at least one standing platform, at least one control unit (6), and at least one loading fork, and at least two longitudinal outriggers, which are arranged parallel to one another and at a distance from one another and extend in a longitudinal direction of the transport vehicle and between which the loading fork is arranged so as to be height-adjustable and which are in each case connected to the drive unit by one end section and at the respective other end section of which in each case at least one non-steerable vehicle wheel is arranged.

8 Claims, 3 Drawing Sheets

(51) Int. Cl.
  *B62B 3/06*   (2006.01)
  *B60P 1/44*   (2006.01)
  *B66F 9/12*   (2006.01)

(52) U.S. Cl.
  CPC ...... *B66F 9/07513* (2013.01); *B66F 9/07522* (2013.01); *B60P 1/4471* (2013.01); *B62B 2203/26* (2013.01); *B66F 9/12* (2013.01)

(58) Field of Classification Search
  CPC .. B62B 2203/26; B66F 9/065; B66F 9/07504; B66F 9/07513; B66F 9/07522
  See application file for complete search history.

(56) References Cited

U.S. PATENT DOCUMENTS

| | | | | |
|---|---|---|---|---|
| 3,610,452 | A | * | 10/1971 | Holt ........................ B60P 1/025 414/812 |
| 4,155,471 | A | * | 5/1979 | Yancy ....................... B60P 1/34 414/469 |
| 4,511,303 | A | * | 4/1985 | O'Neill ................... B60P 1/025 414/458 |
| 6,343,674 | B1 | * | 2/2002 | Sexsmith ................... B66F 9/22 187/244 |
| 6,808,357 | B2 | | 10/2004 | Lee |
| 8,182,193 | B2 | * | 5/2012 | Gaudet ................... B60G 3/145 280/6.151 |
| 8,376,089 | B2 | | 2/2013 | Stone |
| 10,679,173 | B2 | * | 6/2020 | Olsen ..................... H04W 4/029 |
| 11,167,967 | B2 | * | 11/2021 | Hoffman ................... B66F 9/24 |
| 2003/0205433 | A1 | * | 11/2003 | Hagman ................... B66F 9/20 187/231 |
| 2011/0268543 | A1 | * | 11/2011 | Welch ................... B60P 1/6445 414/812 |
| 2019/0164113 | A1 | | 5/2019 | Fosgard |

FOREIGN PATENT DOCUMENTS

| | | | | |
|---|---|---|---|---|
| CN | 110294438 | A | * 10/2019 | .............. B66F 9/065 |
| GB | 2221444 | A | * 2/1990 | .............. B62B 3/06 |

* cited by examiner

TRANSPORT VEHICLE AND TRANSPORT SYSTEM

CROSS-REFERENCE TO RELATED APPLICATIONS

The present application claims priority to and the benefit of German Patent Application No. 102020121594.0, filed Aug. 18, 2020, which is hereby incorporated by reference herein in its entirety.

FIELD

The invention relates to a transport vehicle for transporting at least one transport unit, comprising at least one drive unit having at least one electric drive, at least one steerable vehicle wheel, which can be driven by the drive, and at least one standing platform, on which a person can stand during travel of the transport vehicle, at least one control unit, which is connected to the drive unit and is intended for controlling the drive and for steering the vehicle wheel, and at least one loading fork, which is arranged in a height-adjustable manner on the drive unit. Moreover, the invention relates to a transport system having at least one transport vehicle and at least one transport unit, which can be transported by the transport vehicle.

BACKGROUND

The volume of goods delivered is steadily increasing. This is leading to an increase in delivery vehicles on the roads, which is not only costly and inefficient in terms of deliveries, but also causes traffic disruptions and problems with $CO_2$. In particular, the so-called last mile of a delivery, i.e. a final section of a delivery route of an item, is a challenge for cities and courier services. In this case, the cost of the last mile of deliveries may be approximately 50% of the total delivery cost. This is particularly relevant in view of the fact that the courier market is subject to strong competition, and customers expect fast delivery, free delivery and on-demand delivery seven days a week.

U.S. Pat. No. 6,808,357 B2 discloses a lift truck with a loading fork, wherein a distance between fork tines of the loading fork relative to one another can be adjusted.

U.S. Pat. No. 8,376,089 B2 discloses a lifting device having a support frame which has a vertical mast, and a carriage which has a loading fork, the carriage being arranged in a height-adjustable manner on the vertical mast. In addition, the lifting device has two outriggers, which are connected to the support frame, wherein the outriggers are movable between a stowed position and a deployed position. Furthermore, the lifting device has a frame rolling assembly, which is connected to the support frame for the purpose of transporting the lifting device over an underlying surface. Each of the fork tines has a carriage rolling assembly, which is movable between a retracted position and an extended position while the carriage is being raised within a range of lower carriage positions, said carriage rolling assembly always being in contact with the underlying surface as the carriage rolling assembly is moved between the retracted position and the extended position. The outriggers can only be moved to the deployed position when the carriage rolling assembly of each fork tine is substantially in the extended position. The outriggers are not supported on the underlying surface when they are in the stowed position, or when they are in the deployed position while the carriage is being operated within the range of lower carriage positions. The outriggers contact the underlying surface and begin supporting a front side of the lifting device only when the carriage moves up the vertical mast past the range of lower carriage positions, when the carriage is at a transition point between the range of lower carriage positions and a range of raised carriage positions and the carriage rolling assembly is no longer in contact with the underlying surface.

US 2019/0 164 113 A1 discloses intermodal delivery of articles within an at least substantially autonomous carrier that can move along a delivery path. The carrier may dock with a transit vehicle or cooperate directly with a railway to travel along a transit line during delivery. The carrier may also be suitable for safely storing articles therein, for example where a plurality of carriers stops at a storage center located substantially near and/or along the delivery path. The storage center may include a charging station for the carriers, and serve as a portable warehouse for both articles and carriers. When adequately charged, a carrier may deliver the articles to their final destinations, or the articles may be transferred to a load transporter to facilitate first- and/or last-mile delivery.

The publication "Yellow Jack-It®" available under the link https://www.globalindustrial.com discloses a lift truck with adjustable fork width.

SUMMARY

The problem underlying the invention is that of improving the efficiency of the last mile of goods deliveries.

According to the invention, the object is achieved by a transport vehicle having at least two longitudinal outriggers, which are arranged parallel to one another and at a distance from one another and extend in a longitudinal direction of the transport vehicle and between which the loading fork is arranged so as to be height-adjustable and which are in each case connected to the drive unit by one end section and at the respective other end section of which in each case at least one non-steerable vehicle wheel is arranged, the wheel axis of which is aligned transversely to the longitudinal direction of the transport vehicle, and in each case at least one door element is arranged so as to be pivotable about a vertical pivot axis, each door element being arranged so as to be pivotable from a closed position extending transversely to the longitudinal outriggers into an open position extending parallel to the longitudinal outriggers.

It should be noted that the features and measures presented individually in the following description can be combined with one another in any technically feasible manner and indicate further embodiments of the invention. The description additionally characterizes and specifies the invention, in particular in conjunction with the figures.

According to the invention, packages can be distributed in logistics depots and loaded into or onto transport units. The loaded transport units can be set down individually or in a combination of, for example, two to four transport units together by means of vans in an urban area, for example on a parking lot, a free parking space, a curb or the like. A courier can then use a transport vehicle according to the invention for the last mile of delivery in order to pick up at least one parked, loaded transport unit and to deliver the packages contained therein to customers without the courier having to unload packages from a van and without the courier having to wait for a van at a specific location at a specific time. The courier can walk through a pedestrian zone with the transport vehicle, for example, or drive along roads with the transport vehicle. For this purpose, the transport vehicle is designed to be suitable for use on the road. Once all the packages have been delivered, the courier can drive with the transport vehicle to a further transport unit loaded with packages, exchange it for the empty transport unit and continue the delivery of packages. In combination with vans, the transport vehicle according to the invention thus offers a breakthrough for the last mile of goods deliveries, in particular since seamless multimodal deliveries are possible.

The transport vehicle according to the invention is designed to be self-propelled by means of the electric drive, so that a person using the transport vehicle does not have to apply any force themselves to move the transport vehicle. The transport vehicle is thus designed, as it were, as a motor vehicle. The electric drive can be arranged in a housing of the drive unit, which can simultaneously provide the standing platform on which a person can stand during travel of the transport vehicle. In order to give the transport vehicle better driving stability, the drive unit can have two steerable vehicle wheels drivable by the drive or by one drive in each case. In particular, the transport vehicle can be designed as a two-track transport vehicle. Each steerable vehicle wheel is preferably designed to be suitable for use on the road. For this purpose, the steerable vehicle wheel can have, for example, a rim and a tire mounted thereon, for example a pneumatic tire.

The control unit for controlling the drive and for steering the vehicle wheel can be of conventional design, that is to say can have a steering arm which can be pivoted about a vertical axis and the rotational position of which about the vertical axis is converted into a steering movement of the steerable vehicle wheel. In addition, the steering arm can be connected to the drive unit so as to be pivotable about a horizontal axis rotatable about the vertical axis. It is possible, for example, for an actuating unit for manually adjusting an instantaneous speed of travel of the transport vehicle to be arranged on the control unit.

If a person is standing on the standing platform of the drive unit in a driving mode of the transport vehicle, the steering arm can extend substantially vertically, while the person stands behind the control unit in the direction of travel of the transport vehicle and the loading fork leads the drive unit. During this process, the speed of travel of the transport vehicle can be limited to 25 km/h, for example. In a walking mode of the transport vehicle, the person can walk in front of the transport vehicle while the person has grasped the control unit, with the result that the steering arm is arranged inclined to the vertical and the transport vehicle follows the person. The direction of travel of the transport vehicle in the walking mode is the reverse of the direction of travel of the transport vehicle in the driving mode and the maximum speed of the transport vehicle in the walking mode can be 5 km/h, for example.

The loading fork can be arranged on the drive unit in a height-adjustable manner by means of an electric height adjustment device. The loading fork has two fork tines arranged parallel to one another and at a distance from one another. The distance of the fork tines relative to one another can be fixedly predetermined or variably settable to enable the transport vehicle to be adapted to the respective transport unit.

The longitudinal outriggers form a lateral boundary of the transport vehicle. The longitudinal outriggers can each be designed, for example, as a hollow profile, in particular as a box profile. The fact that the loading fork is arranged in a height-adjustable manner between the longitudinal outriggers means that the loading fork is arranged in any height position between the two longitudinal outriggers in a plan view of the transport vehicle. Each longitudinal outrigger is connected to the drive unit by one end section in such a way as to be non-rotatable with respect to an imaginary axis oriented transversely to the longitudinal direction of the transport vehicle. Arranged on the other end section of the respective longitudinal outrigger is a non-steerable vehicle wheel, the wheel axis of which is oriented transversely to the longitudinal direction of the transport vehicle or transversely to the longitudinal extent of the respective longitudinal outrigger. The non-steerable vehicle wheels are preferably designed to be suitable for use on the road. For this purpose, the respective non-steerable vehicle wheel can have, for example, a rim and a tire mounted thereon, for example a pneumatic tire. The respective door element on the respective longitudinal outrigger can be arranged so as to be pivotable about the respective vertical pivot axis via at least one joint, in particular a hinge.

In order to pick up and transport a transport unit standing on an underlying surface by means of the transport vehicle, the door elements are first pivoted from their closed positions extending transversely to the longitudinal outriggers into their open positions extending parallel to the longitudinal outriggers. The loading fork can then be lowered. The transport vehicle is then maneuvered relative to the transport unit in such a way that the fork tines of the loading fork are guided under sections of the transport unit. The loading fork is then raised, thereby lifting the transport unit off the underlying surface. Finally, the door elements are pivoted back into their closed positions. As a result, the transport system formed by the transport vehicle and the transport unit is ready to move. By reversing this loading process, the transport unit can be unloaded again from the transport vehicle.

The transport unit can be designed, for example, as a transport pallet or as a, in particular closable, transport box. In the case of a transport pallet, it can be partially enclosed laterally and on a side facing away from the drive unit by the longitudinal outriggers and the door elements in its state loaded onto the transport vehicle. In the case of a transport box, a bottom-side substructure of the transport box can be partially enclosed by the longitudinal outriggers and the door elements in its state loaded onto the transport vehicle. In this case, the bottom-side substructure of the transport box can be designed in the manner of a transport pallet.

According to an advantageous embodiment, at least one support element is arranged on each door element, the support elements being arranged on the door elements in such a way that, when the door elements are in the closed positions, free ends of fork tines of the loading fork can be laid on the support elements in a raised state of the loading fork. As a result, a moment acting on the fork tines in the loaded state of the transport vehicle can be reduced, making the driving mode of the transport vehicle more robust. The respective support element is arranged on an inner side of the respective door element which faces the loading fork in the closed position of the respective door element.

A further advantageous embodiment provides for the longitudinal outriggers to be arranged adjustably on the drive unit, thus enabling a distance between the longitudinal outriggers to be varied. The width of the transport vehicle can thereby be adapted to different transport units. For example, it is possible to use the transport vehicle to transport units, the width of which is in a range from 60 cm to 100 cm. This also makes it possible to transport Euro pallets with a width of 80 cm.

According to another advantageous embodiment, on the end section of each longitudinal outrigger which is connected to the drive unit, in each case at least two cross members are arranged parallel to one another and at a distance from one another and transversely to the longitudinal outrigger and are guided in a longitudinally movable manner on the drive unit. In order to increase the width of the transport vehicle, the cross members can be pulled out of the drive unit or its housing, preferably simultaneously on both sides of the drive unit. In order to reduce the width of the transport vehicle, the cross members can be pushed into the drive unit or its housing, preferably simultaneously on both sides of the drive unit. By using two cross members per longitudinal outrigger, the moments acting on the longitudinal outrigger can be better absorbed.

According to another advantageous embodiment, at least one running wheel is arranged in a height-adjustable manner on each door element, wherein a wheel axis of the respective running wheel is aligned orthogonally to the wheel axes of the non-steerable vehicle wheels when the door element is in the open position, wherein the running wheels are arranged so as to be height-adjustable in such a way that the non-steerable vehicle wheels are arranged so as to be raised from a traversable underlying surface when the running wheels are fully lowered. In this position, the longitudinal outriggers can be extended or retracted without the non-steerable vehicle wheels scraping over the ground. This is advantageous, particularly if the longitudinal outriggers are arranged adjustably on the drive unit, thus enabling a distance between the longitudinal outriggers to be varied, since otherwise the non-steerable vehicle wheels on the longitudinal outriggers could scrape over the ground in the event of such a variation in the distance between the longitudinal outriggers, which could make the distance variation more difficult or even impossible. This can be prevented by fully lowering the running wheels so that the non-steerable vehicle wheels are arranged so as to be raised from the traversable underlying surface, and by pivoting the door elements into their open positions before or after lowering the running wheels, thus ensuring that the running wheels roll on the underlying surface during the adjustment of the distance between the longitudinal outriggers. The running wheels can have tires made of polyurethane, for example.

In order to pick up and transport a transport unit standing on an underlying surface by means of the transport vehicle according to the last-mentioned advantageous embodiment, the door elements are first pivoted from their closed positions extending transversely to the longitudinal outriggers into their open positions extending parallel to the longitudinal outriggers. The running wheels can then be lowered until the non-steerable vehicle wheels are arranged so as to be raised from the underlying surface. The distance between the longitudinal outriggers can then be increased. The running wheels can then be raised again until the non-steerable vehicle wheels again stand on the underlying surface and the running wheels are arranged at a distance from the underlying surface. The loading fork can then be lowered. The transport vehicle is then maneuvered relative to the transport unit in such a way that the fork tines of the loading fork are guided under sections of the transport unit. The loading fork is then raised, thereby lifting the transport unit off the underlying surface. The running wheels can then be lowered again until the non-steerable vehicle wheels are arranged so as to be raised from the underlying surface. The distance between the longitudinal outriggers can then be reduced, for example until the longitudinal outriggers rest laterally against the transport unit. The running wheels can then be raised again until the non-steerable vehicle wheels again stand on the underlying surface and the running wheels are arranged at a distance from the underlying surface. Finally, the door elements are pivoted back into their closed positions. As a result, the transport system formed by the transport vehicle and the transport unit is ready to move.

Another advantageous embodiment envisages that at least one height adjustment device for adjusting a height of a respective running wheel is arranged on each door element, wherein the height adjustment device has at least one electric drive and at least one transmission, which can be driven by the electric drive. In particular, the transmission can be designed as a step-down transmission. In addition, the transmission can have self-locking in order to prevent the respective running wheel from automatically adjusting in height due to its respective load. The transmission can have a shaft which can be driven by the electric drive and is provided with circumferential toothing, and a toothed rack or toothed plate which locks with the toothing and is arranged on a holding element which is arranged on the respective door element in a height-adjustable manner and by means of which the respective running wheel is held.

The above object is furthermore achieved by means of a transport system, wherein the transport vehicle is designed according to one of the abovementioned embodiments or a combination of at least two of these embodiments with one another.

The advantages mentioned above in respect of the transport vehicle are correspondingly associated with the transport system. The transport unit can be designed as a transport box or as a transport pallet, in particular as a Euro pallet.

According to one advantageous embodiment, the transport unit is designed as a closable transport box. The transport unit itself thereby serves as a microstore in which goods or packages can be temporarily stored in a manner which is theft-proof and protected from environmental influences. The transport unit can have an integral substructure which, after the transport unit has been raised by means of the transport vehicle, can be partially enclosed by the longitudinal outrigger and the door elements. In this case, a transport section of the transport unit which is arranged above the substructure can be designed to be wider than the substructure, thus enabling the transport section to rest on the longitudinal outrigger. The transport unit can be designed, for example, for receiving and temporarily storing hot or cold foodstuffs, cooled medicaments or the like.

Another advantageous embodiment envisages that the transport unit has at least one anti-theft alarm system and/or at least one GPS tracker. By means of the anti-theft alarm system, an alarm signal can be emitted by the transport unit if an actuation of the transport unit by unauthorized persons is detected, it being possible, for example, for sensor systems and/or electronics to be installed in the transport units for this purpose. By means of the GPS tracker, the transport units can be dynamically located, i.e. tracked, at any time, which can also be a measure against theft, especially if the transport unit contains valuable goods and is parked unattended.

According to another advantageous embodiment, in each case at least one load securing projection is arranged on mutually facing sides of the longitudinal outriggers, and in each case at least one load securing aperture is arranged on sides of the transport unit that face away from one another, wherein the respective load securing projection engages in the respective transport securing aperture when the transport unit is arranged on the transport vehicle. The respective load securing projection can be brought into engagement with the respective load securing aperture if the longitudinal outriggers, which have initially been moved apart, are moved towards one another again after the loading fork has been raised together with the transport unit. As a result of these load securing measures, the transport unit can be connected to the transport vehicle in part in a positive-locking manner, improving the robustness of the transport system.

BRIEF DESCRIPTION OF THE DRAWINGS

Further advantageous embodiments of the invention are disclosed in the dependent claims and the following description of the figures, of which:

DETAILED DESCRIPTION

In the different figures, identical parts are always provided with the same reference signs, for which reason they are generally also only described once.

Figure 1:
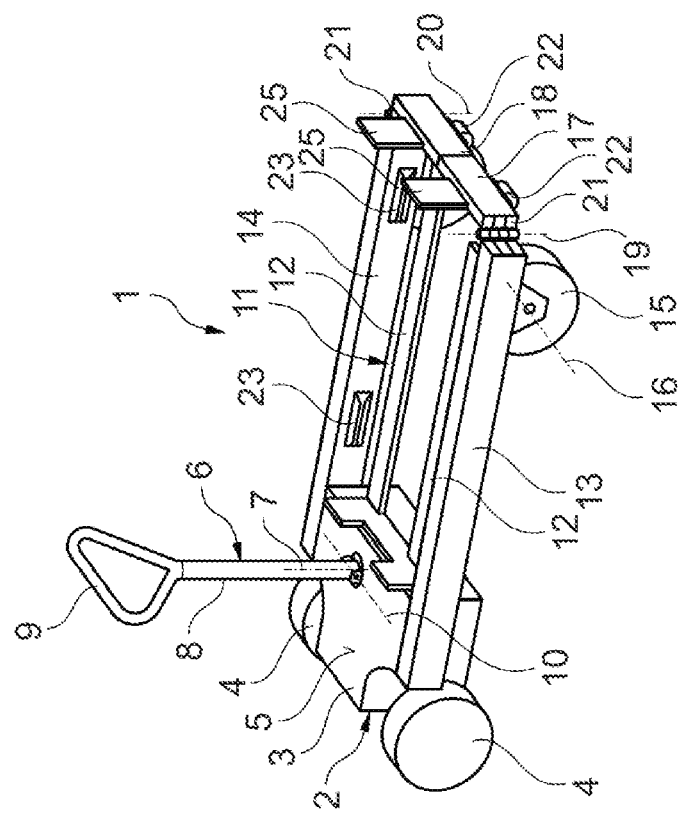
FIG. 1 shows a schematic and perspective illustration of an exemplary embodiment for a transport vehicle according to the invention.
Figure 6:
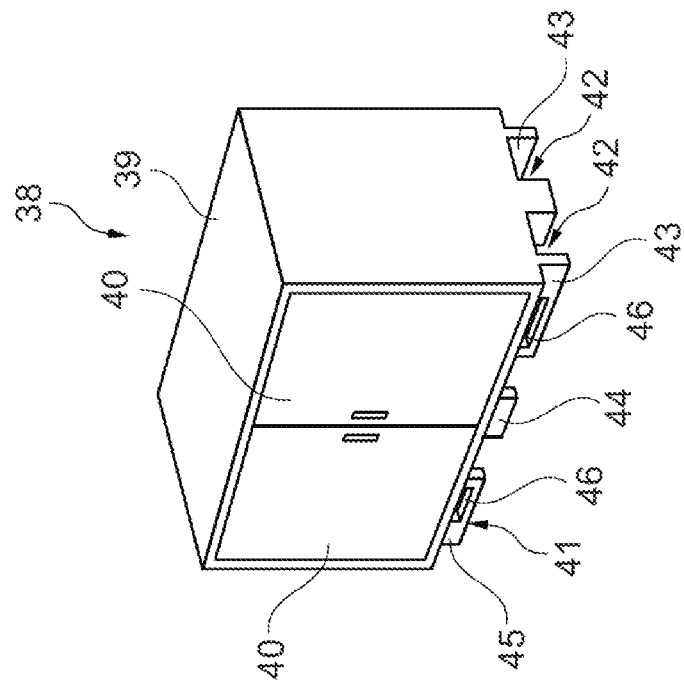
FIG. 6 shows a schematic and perspective illustration of the transport unit shown in FIG. 5.
Figure 5:
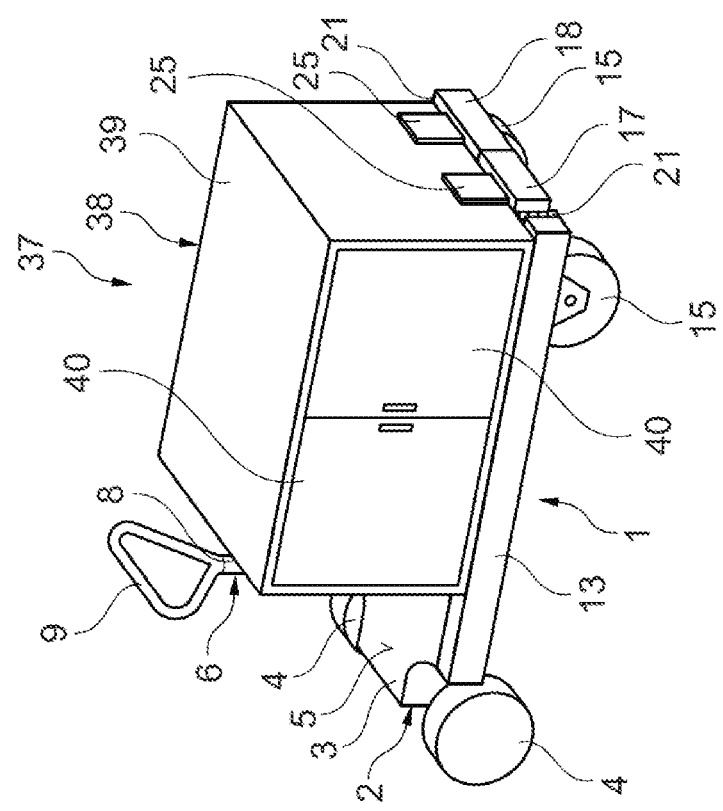
FIG. 5 shows a schematic and perspective illustration of an exemplary embodiment for a transport system according to the invention.

FIG. 1 shows a schematic and perspective illustration of an exemplary embodiment for a transport vehicle 1 according to the invention for transporting a transport unit shown in FIGS. 5 and 6.

The transport vehicle 1 has a drive unit 2 with a housing 3, at least one electric drive (not shown) arranged in the housing 3, two steerable vehicle wheels 4, which can be driven by the drive, and a standing platform 5, on which a person can stand while the transport vehicle 1 is traveling.

In addition, the transport vehicle 1 has a control unit 6 connected to the drive unit 2 for controlling the drive and for steering the vehicle wheels 4, which control unit has a steering arm 8 that can be pivoted about a vertical axis 7 and at the free end of which a handle 9 is arranged and the rotation of which about the vertical axis 7 is converted into a steering movement of the steerable vehicle wheels 4. In addition, the steering arm 8 is connected to the drive unit 2 so as to be pivotable about a horizontal axis 10 rotatable about the vertical axis 7. It is possible, for example, for an actuating unit (not shown) for manually adjusting an instantaneous speed of travel of the transport vehicle 1 to be arranged on the control unit 6.

Furthermore, the transport vehicle 1 has a loading fork 11, which is arranged in a height-adjustable manner on the drive unit 2 and has two fork tines 12, which are arranged parallel to one another and at a distance from one another.

In addition, the transport vehicle 1 has two longitudinal outriggers 13 and 14 arranged parallel to one another and at a distance from one another and extending in a longitudinal direction of the transport vehicle 1. The loading fork 11 is arranged in a height-adjustable manner between the longitudinal outriggers 13 and 14. Each longitudinal outrigger 13 or 14 is connected by one end section to the drive unit 2. A non-steerable vehicle wheel 15, whose wheel axis 16 is oriented transversely to the longitudinal direction of the transport vehicle 1, is arranged on the opposite, other end section of the respective longitudinal outrigger 13 or 14. In addition, a door element 17 or 18 is arranged on the other end section of the respective longitudinal outrigger 13 or 14 so as to be pivotable about a vertical pivot axis 19 or 20. For this purpose, the respective door element 17 or 18 is connected to the respective longitudinal outrigger 13 or 14 via a respective hinge 21. Arranged on each of the mutually facing sides of the longitudinal outriggers 13 and 14 are two load securing projections 23, the mode of operation of which becomes clear from a combination of FIGS. 1 and 6.

The longitudinal outriggers 13 and 14 are arranged adjustably on the drive unit 2, thus enabling a distance between the longitudinal outriggers 13 and 14 to be varied. For this purpose, on the end section of each of the longitudinal outriggers 13 or 14 which is connected to the drive unit 2, in each case two cross members are arranged parallel to one another and at a distance from one another and transversely to the longitudinal outrigger 13 or 14, which cross members are shown in FIG. 2 and are guided movably on the drive unit 2, thus enabling the transverse spacing of the longitudinal members 13, 14 to be varied.

Each door element 17 or 18 is arranged so as to be pivotable from a closed position extending transversely to the longitudinal outriggers 13 and 14 and shown in FIGS. 1 and 3 to 5 into an open position (not shown) extending parallel to the longitudinal outriggers 13 and 14. Arranged on each door element 17 or 18 is a holding element 25, shown in FIG. 3, on which a support element 26 is arranged in such a way that, when the door elements 17, 18 are in the closed positions, free ends of the fork tines 12 of the loading fork 11 can be laid on the support elements 26 in a raised state of the loading fork 11.

Figure 4:
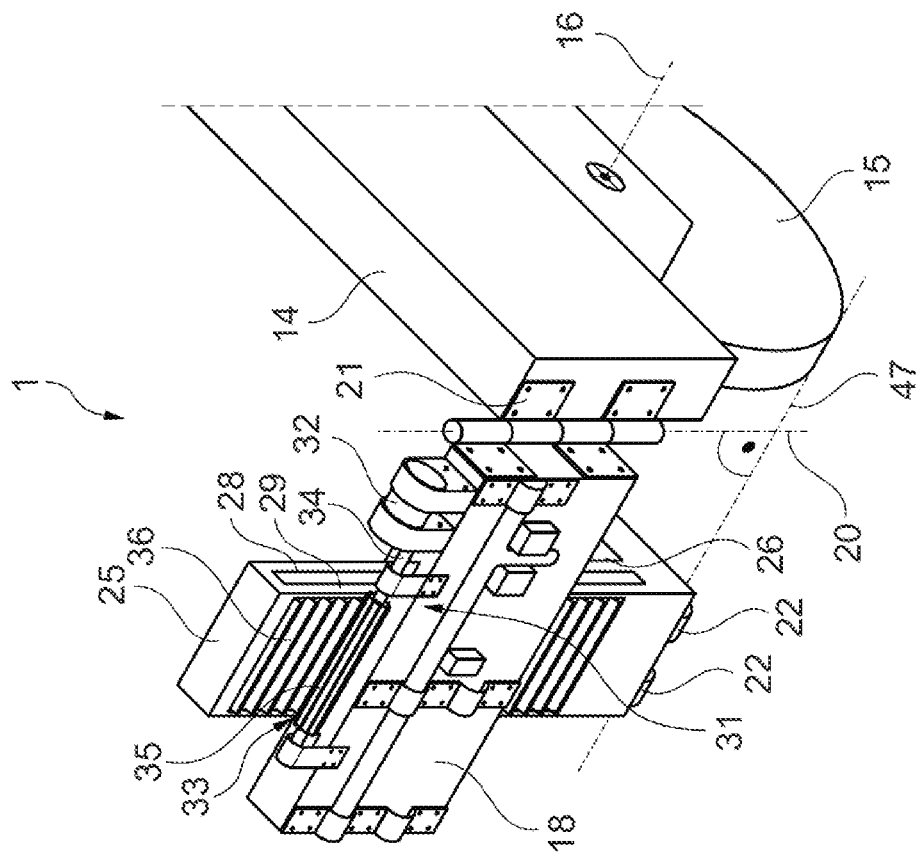
FIG. 4 shows a further schematic and perspective illustration of the detail shown in FIG. 3.

An associated holding element 25 is arranged in a height-adjustable manner on each door element 17 or 18. Two running wheels 22 are arranged on each holding element 25. A common wheel axis 47 of these running wheels 22 intersects the respectively associated vertical pivot axis 19 or 20 and is arranged orthogonally thereto and thus always horizontally. The door elements 17 and 18 can thus be pivoted even while the running wheels 22 are resting on the underlying surface, and the non-steerable vehicle wheels 15 are raised. For this purpose, a height adjustment device 31, shown in FIG. 4, for adjusting a height of the respective holding element 25 is arranged on each door element 17 or 18. The respective height adjustment device 31 has an electric drive shown in FIG. 4 and a transmission, which can be driven by the electric drive and is shown in FIG. 4. In the open position (not shown) of the door elements 17 and 18, the wheel axis 47 is orthogonal to the wheel axes 16 of the non-steerable vehicle wheels 15. The running wheels 22 are arranged on the respective height-adjustable holding element 25 in such a way that the non-steerable vehicle wheels 15 are arranged so as to be raised from a traversable underlying surface when the holding elements 25 are fully lowered. Thus, when the door elements 17 and 18 are open and the running wheels 22 are lowered, it is ensured that in this position the longitudinal outriggers 13 and 14 can be extended or retracted without the non-steerable vehicle wheels 15 scraping over the underlying surface.

Figure 2:
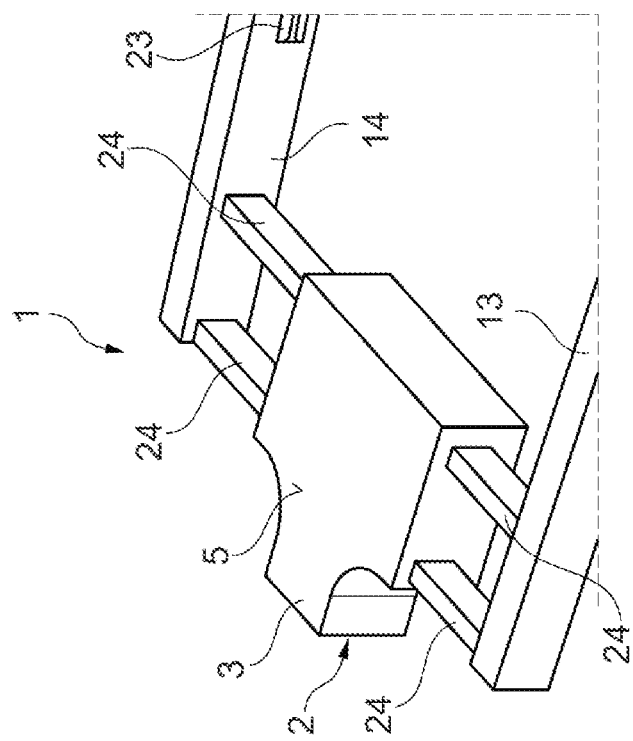
FIG. 2 shows a schematic and perspective illustration of a detail of the transport vehicle shown in FIG. 1.

FIG. 2 shows a schematic and perspective illustration of a detail of the transport vehicle 1 shown in FIG. 1, FIG. 2 illustrating that the longitudinal outriggers 13 and 14 are arranged adjustably on the drive unit 2, thus enabling a distance between the longitudinal outriggers 13 and 14 to be varied. For this purpose, on the end section of each longitudinal outrigger 13 or 14 which is connected to the drive unit 2, in each case at least two cross members 24 are arranged parallel to one another and at a distance from one another and transversely to the longitudinal outrigger 13 or 14 and are guided in a longitudinally movable manner on the drive unit 2. FIG. 2 shows the cross members 24 in a fully extended state.

Figure 3:
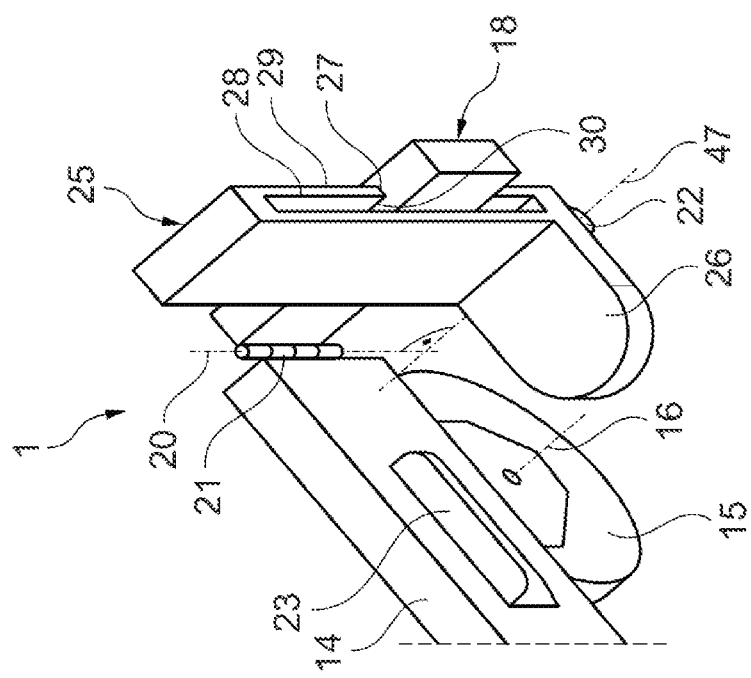
FIG. 3 shows a schematic and perspective illustration of another detail of the transport vehicle shown in FIG. 1.

FIG. 3 shows a schematic and perspective illustration of another detail of the transport vehicle 1 shown in FIG. 1. In particular, it shows that the holding element 25 is guided on the door element 18 in a height-adjustable manner, and that the support element 26 and also the running wheels 22 are arranged on the holding element 25. A vertical opening 27 of slot-type design is formed on the door element 18. A slot-like horizontal opening 28 is formed on the holding element 25. A section 29 of the holding element 25 which delimits the opening 28 is passed through the vertical opening 27 of the door element 18, and a section 30 of the door element 18 which delimits the opening 27 is passed through the horizontal opening 28 of the holding element 25.

FIG. 4 shows a further schematic and perspective illustration of the detail shown in FIG. 3. In particular, it shows the height adjustment device 31, arranged on the door element 18, for adjusting a height of the holding element 25 and thus of the running wheels 22 held by it. The height adjustment device 31 has an electric drive 32 and a transmission 33, which can be driven by the electric drive 32. The transmission 33 has a shaft 34, which can be driven by the electric drive 32 and has circumferential toothing 35, and a toothed plate 36, which is arranged on the holding element 25 and meshes with the toothing 35.

FIG. 5 shows a schematic and perspective illustration of an exemplary embodiment for a transport system 37 according to the invention, which has a transport vehicle 1 according to the exemplary embodiment shown in FIGS. 1 to 4 and a transport unit 38 that can be transported with the transport vehicle 1. The transport unit 38 is designed as a closable transport box and has a housing body 39 which is closed laterally by two doors 40. The width of the transport unit 38 corresponds to the width of the transport vehicle 1. Further details of the construction of the transport unit 38 are shown in FIG. 6. The transport unit 38 can have an anti-theft alarm system (not shown) and/or at least one GPS tracker (not shown).

FIG. 6 shows a schematic and perspective illustration of the transport unit 38 shown in FIG. 5. The transport unit 38 has a substructure 41, which is arranged below the housing body 39, is designed partially to match a transport pallet (not shown) and has two passages 42, through which the fork tines shown in FIG. 1 can be passed. The passages 42 are each delimited on the outside by wall elements 43, 44 and 45. Arranged on the wall elements 43 and 45, which form sides of the transport unit 38 that face away from one another, is in each case a load securing aperture 46, into which the respective load securing projections shown in FIGS. 1 to 3 engage when the transport unit 38 is arranged on the transport vehicle shown in FIGS. 1 to 5.

LIST OF REFERENCE SIGNS 1 transport vehicle
2 drive unit
3 housing of 2
4 steerable vehicle wheel
5 standing platform of 2
6 control unit
7 vertical axis
8 steering arm of 6
9 handle of 6
10 horizontal axis
11 loading fork
12 fork tine
13 longitudinal outrigger
14 longitudinal outrigger
15 non-steerable vehicle wheel
16 wheel axis of 15
17 door element
18 door element
19 vertical pivot axis
20 vertical pivot axis
21 hinge
22 running wheel
23 load securing projection
24 cross members
25 holding element
26 support element
27 vertical opening at 17, 18
28 horizontal opening at 25
29 section of 25
30 section of 17, 18
31 height adjustment device
32 electric drive
33 transmission
34 shaft
35 toothing on 34
36 toothed plate
37 transport system
38 transport unit
39 housing body of 38
40 door of 38
41 substructure of 38
42 passage in 41
43 wall element of 41
44 wall element of 41
45 wall element of 41
46 load securing aperture
47 wheel axis of 22

The invention claimed is:

1. A transport vehicle (1) the transport vehicle comprising:
at least one drive unit;
at least one steerable vehicle wheel configured to be driven by the at least one drive unit;
a standing platform disposed on the drive unit, configured to support a standing person while driving the transport vehicle;
a steering arm, configured to be separately pivoted about a vertical axis and rotated about a horizontal axis orthogonal to a longitudinal direction of the transport vehicle, wherein pivoting the steering arm about the vertical axis controls a direction of the at least one steerable vehicle wheel, and wherein rotating the steering arm about the horizontal axis engages the drive unit;
a first longitudinal outrigger having a first proximal end disposed on the drive unit and a first distal end extending in the longitudinal direction of the transport vehicle;
a second longitudinal outrigger having a second proximal end disposed on the drive unit and a second distal end extending in the longitudinal direction of the transport vehicle,
wherein the first longitudinal outrigger and the second longitudinal outrigger are laterally adjustable so that a distance between the first longitudinal outrigger and the second longitudinal outrigger may be varied;
a first loading fork and a second loading fork each having a third proximal end disposed on the drive unit between the first longitudinal outrigger and the second longitudinal outrigger and a third distal end extending in the longitudinal direction of the transport vehicle, wherein the first loading fork and the second loading fork are configured to be height-adjustable between a first height and a second height;
a first non-steerable wheel and a second non-steerable wheel disposed on the first distal end and the second distal end respectively, the first non-steerable wheel and the second non-steerable wheel rotating about a non-steerable wheel axis being transverse to the longitudinal direction of the transport vehicle;
a first door element dynamically coupled to the first distal end of the first longitudinal outrigger and a second door element dynamically coupled to the second distal end of the second longitudinal outrigger, the first door element and the second door element are configured to be height-adjustable so that, when fully lowered to a traversable underlying surface, the first non-steerable wheel and the second non-steerable wheel are raised off the traversable underlying surface, wherein the first door element is configured to rotate about a first vertical door axis and the second door element is configured to rotate about a second vertical door axis;
wherein rotating the first door element about the first vertical door axis and rotating the second door element about the second vertical door axis transitions the first door element and the second door element between an open position and a closed position;
a first set of running wheels disposed on the first door element and a second set of running wheels disposed on the second door element are configured to allow the first door element and the second door element to transition between the open position and the closed position while the first door element and the second door element are fully lowered to the traversable underlying surface, the first set of running wheels and the second set of running wheels configured to allow the first longitudinal outrigger and the second longitudinal outrigger to be laterally adjusted while in the open position; and
a first support element disposed on the first door element and a second support element disposed on the second door element, wherein, while in the closed position, the first support element and the second support element are configured to support the third distal end of each the first loading fork and the second loading fork at any height between the first height and the second height.

2. The transport vehicle (1) according to claim 1, wherein the first proximal end and the second proximal end each have two cross members (24) arranged transversely to the longitudinal direction of the transport vehicle, the two cross members being laterally actuated in order to laterally adjust the first longitudinal outrigger and the second longitudinal outrigger.

3. The transport vehicle (1) according to claim 1, wherein a running wheel axis (47) of the first set of running wheels and the second set of running wheels (22) are aligned orthogonally to the non-steerable wheel axes (16) when the first door element and the second door element (17, 18) are in the open position, wherein the first set of running wheels and the second set of running wheels (22) are arranged so as to be height-adjustable in such a way that the first non-steerable wheel and the second non-steerable wheels (15) are raised from the traversable underlying surface when the first set of running wheels and the second set of running wheels (22) are fully lowered.

4. The transport vehicle (1) according to claim 3, further comprising:
at least one height adjustment device (31) for adjusting a height of the first set of running wheels and the second set of running wheels (22) arranged on each of the first door element and the second door element (17, 18), wherein the height adjustment device (31) has at least one electric drive (32) and at least one transmission (33), which can be driven by the electric drive (32).

5. A transport system comprising:
a transport vehicle comprising:
at least one drive unit;
at least one steerable vehicle wheel configured to be driven by the at least one drive unit;
a standing platform disposed on the drive unit, configured to support a standing person while driving the transport vehicle;
a steering arm, configured to be separately pivoted about a vertical axis and rotated about a horizontal axis orthogonal to a longitudinal direction of the transport vehicle, wherein pivoting the steering arm about the vertical axis controls a direction of the at least one steerable vehicle wheel, and wherein rotating the steering arm about the horizontal axis engages the drive unit;
a first longitudinal outrigger having a first proximal end disposed on the drive unit and a first distal end extending in the longitudinal direction of the transport vehicle;
a second longitudinal outrigger having a second proximal end disposed on the drive unit and a second distal end extending in the longitudinal direction of the transport vehicle,
wherein the first longitudinal outrigger and the second longitudinal outrigger are laterally adjustable so that a distance between the first longitudinal outrigger and the second longitudinal outrigger may be varied;
a first loading fork and a second loading fork each having a third proximal end disposed on the drive unit between the first longitudinal outrigger and the second longitudinal outrigger and a third distal end extending in the longitudinal direction of the transport vehicle, wherein the first loading fork and the second loading fork are configured to be height-adjustable between a first height and a second height;
a first non-steerable wheel and a second non-steerable wheel disposed on the first distal end and the second distal end respectively, the first non-steerable wheel and the second non-steerable wheel rotating about a non-steerable wheel axis being transverse to the longitudinal direction of the transport vehicle;
a first door element dynamically coupled to the first distal end of the first longitudinal outrigger and a second door element dynamically coupled to the second distal end of the second longitudinal outrigger, the first door element and the second door element are configured to be height-adjustable so that, when fully lowered to a traversable underlying surface, the first non-steerable wheel and the second non-steerable wheel are raised off the traversable underlying surface, wherein the first door element is configured to rotate about a first vertical door axis and the second door element is configured to rotate about a second vertical door axis;

wherein rotating the first door element about the first vertical door axis and rotating the second door element about the second vertical door axis transitions the first door element and the second door element between an open position and a closed position;

a first set of running wheels disposed on the first door element and a second set of running wheels disposed on the second door element are configured to allow the first door element and the second door element to transition between the open position and the closed position while the first door element and the second door element are fully lowered to the traversable underlying surface, the first set of running wheels and the second set of running wheels configured to allow the first longitudinal outrigger and the second longitudinal outrigger to be laterally adjusted while in the open position;

a first support element disposed on the first door element and a second support element disposed on the second door element, wherein, while in the closed position, the first support element and the second support element are configured to support the third distal end of each the first loading fork and the second loading fork at any height between the first height and the second height; and a transport unit configured to be transported by the transport vehicle.

6. The transport system (37) according to claim 5, wherein the transport unit (38) is designed as a closable transport box.

7. The transport system (37) according to claim 5, wherein the transport unit (38) has at least one anti-theft alarm system and/or at least one GPS tracker.

8. The transport system (37) according to claim 5, wherein the first longitudinal outrigger and the second longitudinal outrigger each have at least one load securing projection (23) arranged on a mutually facing side of both the first longitudinal outrigger and the second longitudinal outrigger (13, 14), and wherein at least one load securing aperture (46) is arranged on at least two opposing sides of the transport unit (38) the at least one load securing projection (23) is configured to engages in the respective load securing aperture (46) when the transport unit (38) is arranged on the transport vehicle (1).

* * * * *